Figure 1:
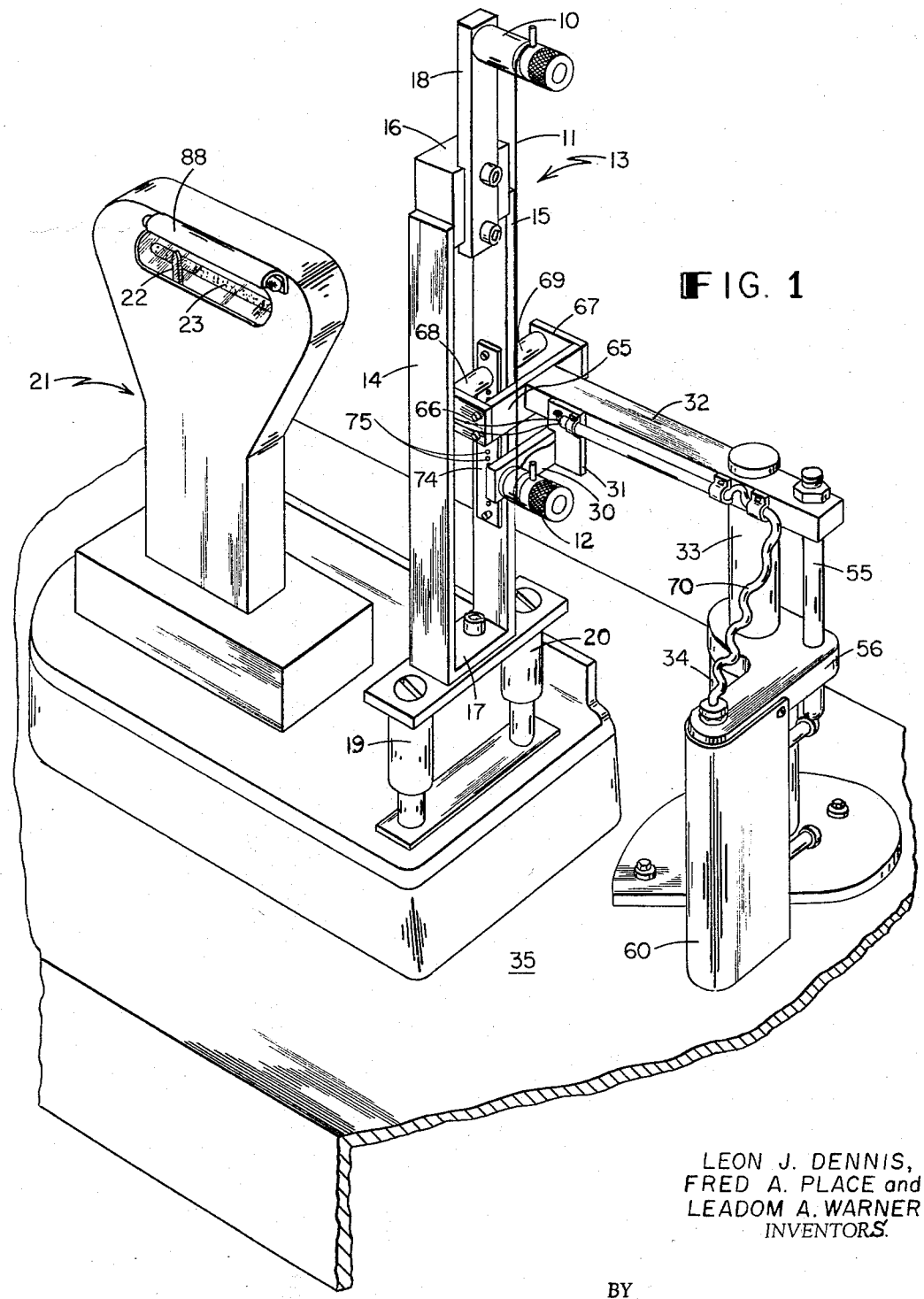

LEON J. DENNIS,
FRED A. PLACE and
LEADOM A. WARNER
INVENTORS.

BY David M. Keay

AGENT.

LEON J. DENNIS,
FRED A. PLACE and
LEADOM A. WARNER
INVENTORS.

BY David M. Keay

AGENT.

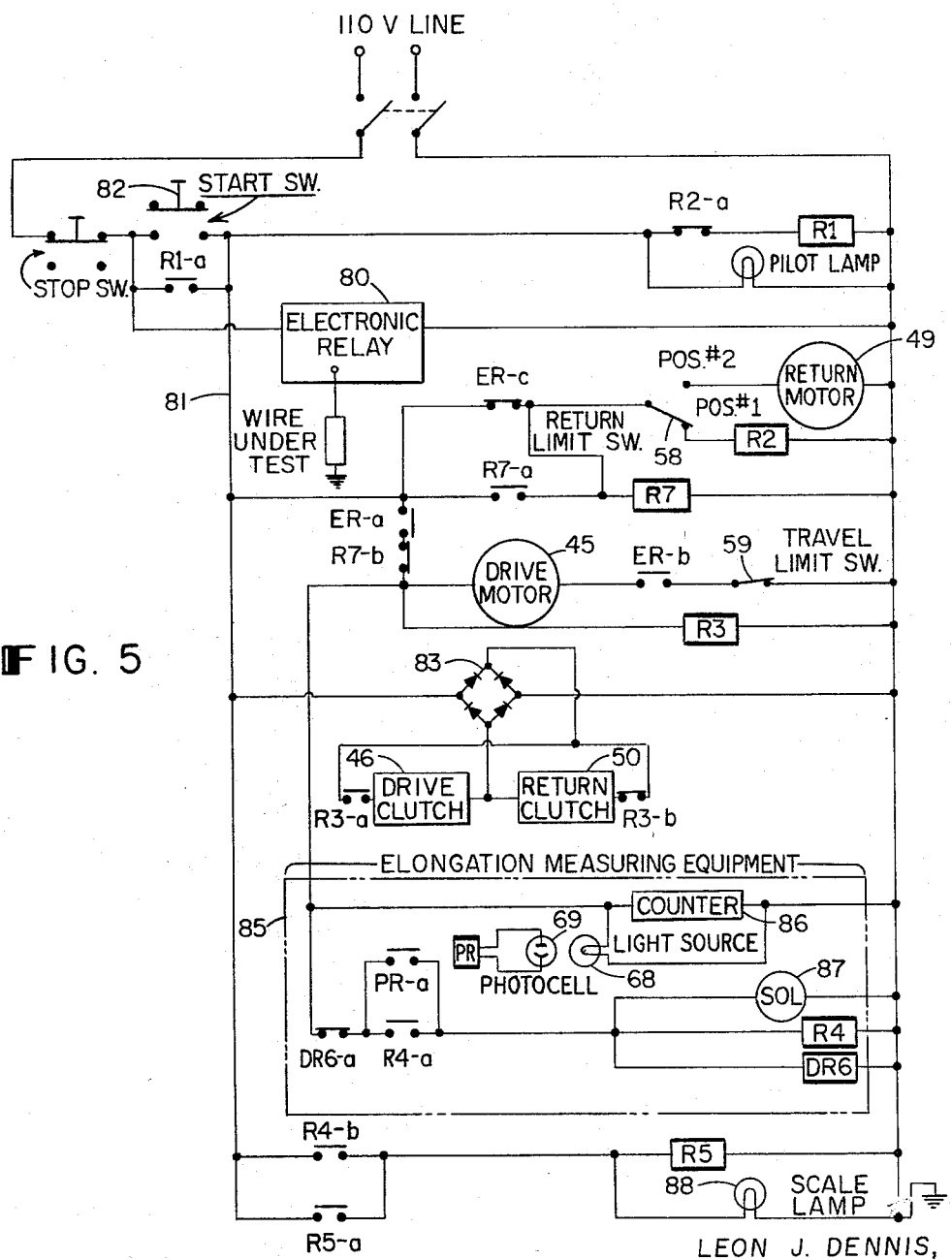

United States Patent Office 3,287,964
Patented Nov. 29, 1966

3,287,964
APPARATUS FOR TESTING FILAMENTARY MATERIAL
Leon J. Dennis and Fred A. Place, Towanda, and Leadom A. Warner, Sayre, Pa., assignors to Sylvania Electric Products Inc., a corporation of Delaware
Filed Jan. 10, 1964, Ser. No. 337,091
4 Claims. (Cl. 73—95)

This invention relates to apparatus for testing filamentary material. More particularly, it is concerned with apparatus for measuring various physical properties of a specimen of wire.

Significant properties of filamentary material of which measurements are frequently made include the ratio of the stress applied to the material with respect to the strain produced, the extent to which the material elongates before breaking, and the breaking stress of the material. With previously available test equipment suitable for conducting frequent in-process testing of filamentary material at various stages during its manufacture, it was difficult to obtain rapid accurate direct determination of these properties. Frequent checking of these properties during the manufacturing process is particularly desirable in the production of extremely fine wire of uniform high quality for the electrical and electronics industry.

It is an object of the present invention, therefore, to provide improved apparatus for testing filamentary materials.

It is another object of the invention to provide improved apparatus for rapidly and accurately measuring the stress-strain relationship, the extent of elongation, and the breaking stress of filamentary materials by conducting a single test procedure on a single sample of the material.

Briefly, apparatus for testing filamentary material according to the foregoing objects of the invention includes a force measuring means having a member adapted to have a force applied thereto and also having a means for indicating the magnitude of the force being applied to the member. A support which has a gripping means for gripping one end of a piece of filamentary material is mounted on the member. A second gripping means for gripping the other end of the piece of filamentary material is mounted on a moveable support. Driving means are provided for moving the moveable support in a direction to move the second gripping means away from the first gripping means. Means are also provided for indicating the distance of relative movement of the second gripping means with respect to the first gripping means.

A specific embodiment of the invention to be described in greater detail hereinafter employs a force measuring mechanism such as a well-known self-indicating type of weighing machine having a force responsive member which is displaced downward a distance which is a function of the magnitude of a downward acting force applied to the member. An indicator is suitably linked to the member for denoting the magnitude of the force being applied to the member. A first clamp for gripping filamentary material is attached to a vertical support mounted on the force responsive member. A second clamp for gripping filamentary material is positioned below the first clamp and is attached to a moveable support. The moveable support is mounted independently of the vertical support and the force responsive member of the force measuring mechanism. A suitable driving arrangement is provided for moving the moveable support vertically. A light source and photocell arrangement mounted on the moveable support cooperates with an apertured opaque member mounted on the vertical support and interposed between the light source and photocell to measure the distance of relative movement between the two supports.

In carrying out a test procedure a specimen of filamentary material is placed between the two clamps, and the driving mechanism is activated to lower the moveable support and its attached clamp. The specimen of filamentary material is placed under tension tending to elongate it. The stress in the filamentary material acts through the first clamp and the vertical support to transmit the force of tension to the force responsive member of the weighing machine so that the magnitude of the force can be determined from the indicator. As the moveable support is moved downward the stress on the sample increases and the sample elongates. The increasing stress causes the vertical support to move downward also but to a lesser extent. The difference between the two downward movements is the absolute elongation of the sample. The light source and photocell arrangement in combination with the apertured opaque member provide an indication of the distance of relative movement between the two supports.

Figure 2:
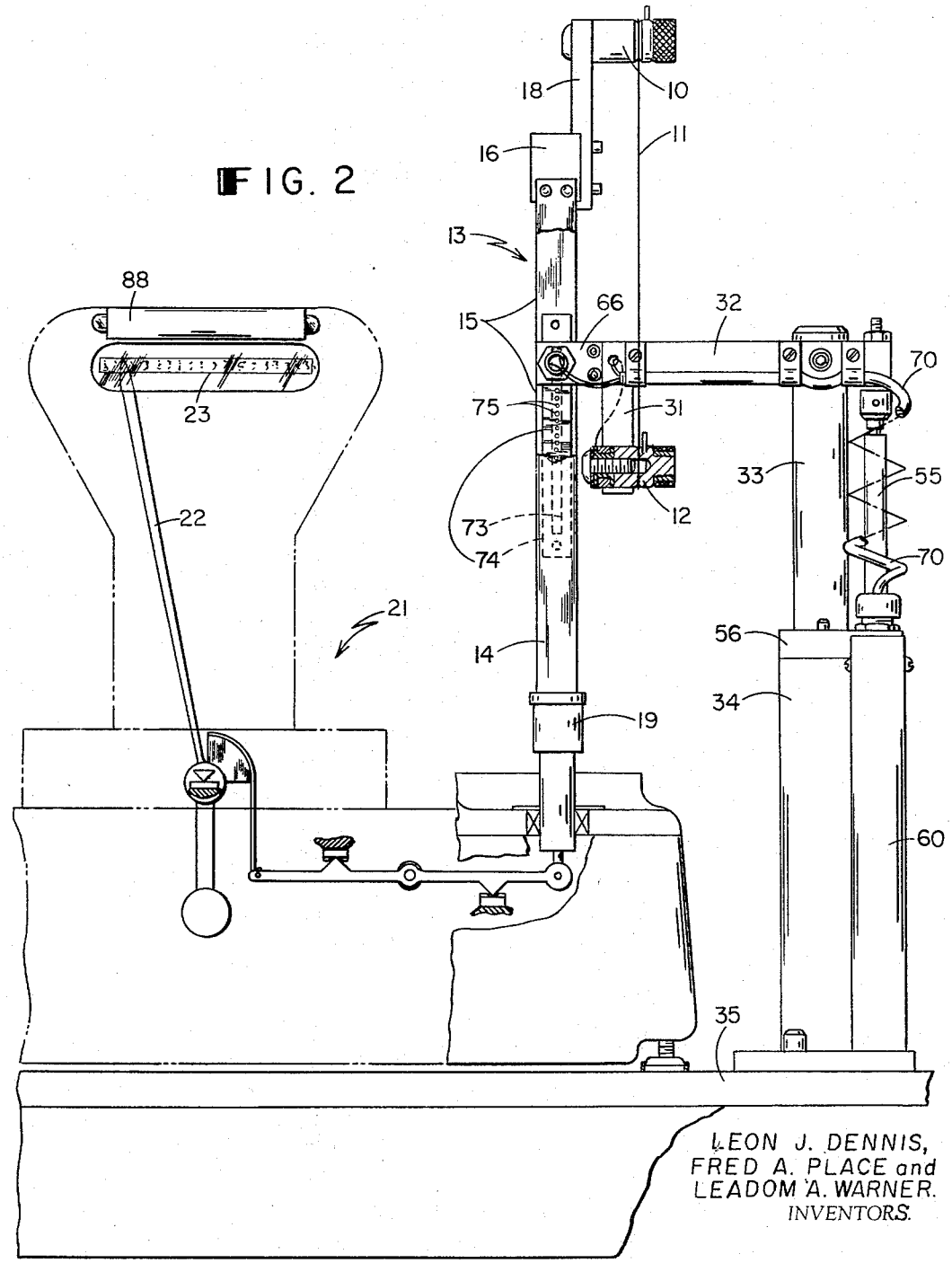
Figure 3:
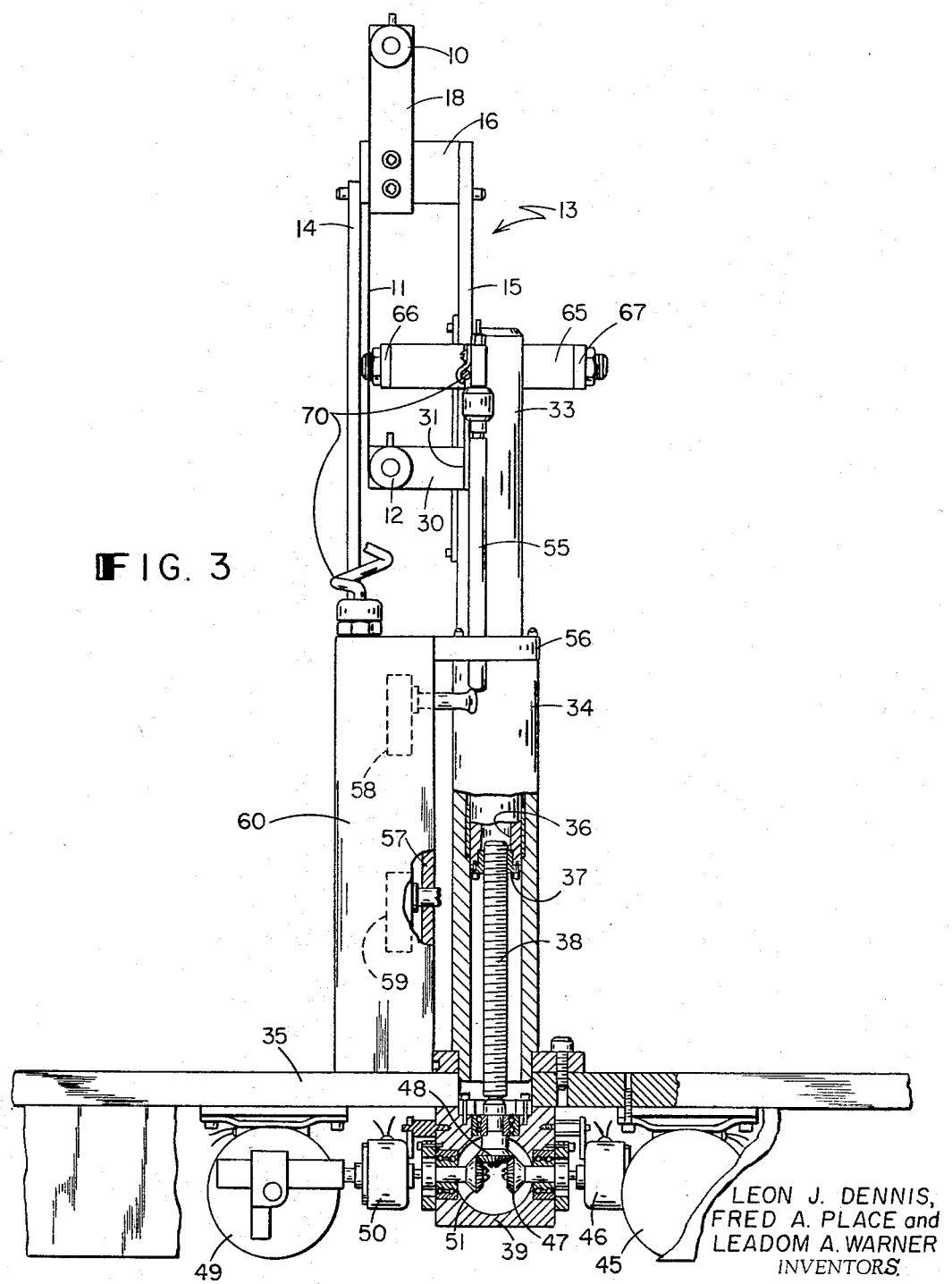
Figure 4:
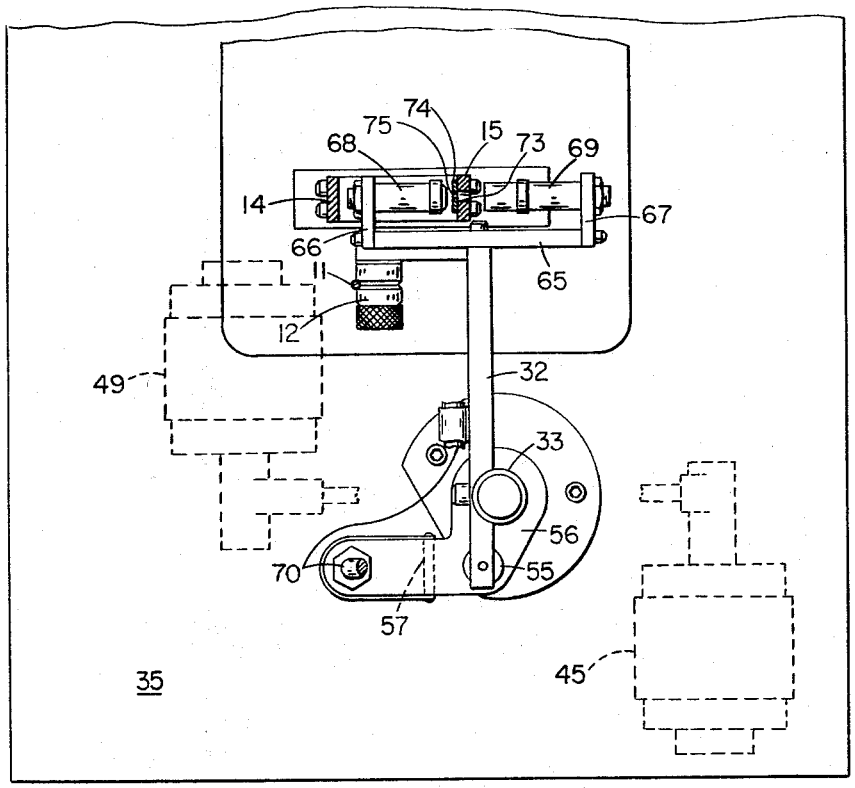

Additional objects, features, and advantages of test apparatus in accordance with the invention will be apparent from the following detailed discussion and accompanying drawings wherein:

FIG. 1 is a perspective view of apparatus according to the invention,

FIG. 2 is an elevational front view of the apparatus of FIG. 1 with portions broken away showing a diagrammatic representation of certain portions of the apparatus, FIG. 3 is an elevational side view of the apparatus of FIG. 1 with portions broken away, FIG. 4 is a detailed view from above showing portions of the apparatus, and FIG. 5 is a schematic diagram of the electrical circuit for controlling the operation of the apparatus.

The apparatus according to the invention as shown in the drawings includes a first wire gripping bar or clamp 10 for gripping one end of the piece of wire 11 to be tested and a second clamp 12 positioned directly below the first clamp for gripping the other end of the wire. The first wire clamp is mounted on a vertical support 13 which includes two upright bars 14 and 15, upper and lower horizontal bars 16 and 17, and an arm 18. The lower bar 17 is secured to the supports 19 and 20 of the force responsive member of a force measuring machine 21. The force measuring machine is any one of various known types of self-indicating weighing machines in which a force acting on a force responsive member balances itself against a variable resistant. The internal mechanism of such a machine is represented schematically in FIG. 2. In order to shift the resistant and thus achieve a balanced condition the force responsive member is displaced downward a distance which is a function of the magnitude of the applied force. The mechanism transmits the movement of the parts to a pointer 22 associated with a scale 23 calibrated to designate the magnitude of the applied force.

The second wire clamp 12 is rigidly mounted by means of supporting arms 30 and 31 and bracket 32 to a support shaft 33. For reasons to be explained hereinafter the clamp is electrically insulated from the arm 30. The support shaft is journaled in a housing 34 for vertical movement. The housing is mounted on a base 35 which may also support the weighing machine. As can be seen in FIG. 3 the support shaft 33 has an axial bore 36 along a major portion of its length. A threaded nut 37 is fixed to the lower end of the shaft. The nut is engaged by a threaded lead screw 38 which is journaled for rotation in a gear housing 39 mounted on the underside of the base 35.

The threaded lead screw 38 is rotated toward the right to lower the support shaft 33 and toward the left to raise it. A drive motor 45 for rotating the lead screw to the right is coupled to the lead screw by way of an electromagnetic drive clutch 46, a bevel gear 47 mounted on a shaft, and a bevel gear 48 affixed to the lower end of the lead screw. The lead screw is rotated to the left by a return motor 49 which is coupled to the bevel gear 48 of the lead screw by way of an electromagnetic return clutch 50 and a bevel gear 51 mounted on a shaft.

Attached to the bracket 32 fixed to the support shaft 33 is a trip bar 55 which is journaled in a horizontal plate 56 mounted on a vertical plate 57 and on the support shaft housing 34. The trip bar moves vertically with the support shaft 33 and serves to prevent rotation of the support shaft. A return limit switch 58 and a travel limit switch 59 are mounted on the vertical plate 57 and are arranged so as to be triggered by the trip bar. The switches are enclosed in a sheet metal housing 60 fastened to the vertical plate 57 so as to provide space for elements of the electrical control apparatus (not shown except in the circuit diagram of FIG. 5).

Mounted on the bracket 32 and perpendicular to it is a horizontally extending support 65 having two arms 66 and 67. A light source 68 is mounted on one of the arms of this bifurcated member or yoke and a photosensitive element or photocell 69 is mounted on the other arm. These elements are arranged so that a horizontal beam of light from the light source will impinge on the photocell thus causing it to generate electrical energy. A flexible coiled cable 70 carries the wiring which provides electrical connections from the light source 68, photocell 69, and insulated second clamp 12 to the electrical elements within the housing 60.

One of the upright bars 15 of the vertical support 13 mounted on the weighing machine is positioned between the light source 68 and photocell 69. An opening 73 extends vertically along the length of the bar providing a passage from the light source to the photocell. A plate or shield 74 of an opaque material having a plurality of light transmitting apertures 75 arranged in a vertical line is mounted over the opening in the bar. The apparatus are spaced apart a predetermined distance. The apertured plate is arranged with respect to the light source and photocell so that each aperture in sequence permits the beam of light from the light source to pass through it and impinge on the photocell as the support shaft 33 and vertical support 13 are moved vertically with respect to each other.

Operation of the apparatus in conducting a test procedure can best be understood by reference to the schematic circuit diagram of FIG. 5 which depicts the electrical control elements and their interconnections. At the outset of a test procedure, the movable support shaft 33 is in a raised position and the first wire clamp 10 and the second wire clamp 12 are separated by a known distance. A sample of wire 11 to be tested is placed in the clamps so as to be taut but under very little tension. The test wire provides a ground connection for the internal circuitry of an electronic relay 80 (details not shown). By virtue of this connection and since electrical power is being supplied to the electronic relay, the relay is energized. The normally-open contacts ER–a and ER–b of the relay are closed and the normally-closed contacts ER–c are open. Electrical power is not being supplied to the line 81 from the 110 volt A.C. power line since both the start switch 82 and relay contacts R1–a are in their normally-open positions. Since the support shaft 33 is in its raised position the trip bar 55 is also in its raised position, and therefore the travel limit switch 59 is in its normally closed postion. The trip bar is just sufficiently clear of the return limit switch 58 so that it assumes its normally biased position which is position #1.

The test procedure is started by momentarily actuating start switch 82 thereby supplying electrical power to the line 81. Current flows through the normally-closed relay contacts R2–a energizing relay R1 and thus closing its contacts R1–a so that release of the start switch 82 does not stop the apparatus once it has been started. The closed contacts ER–a, R7–b, ER–b, and travel limit switch 59 cause the drive motor 45 to be turned on. Power is supplied to the full-wave rectifier 83 which provides direct current for the electromagnetic drive clutch 46 and the electromagnetic return clutch 50. Since relay R3 is energized by virtue of contacts ER–a and R7–b being closed, normally-open contacts R3–a are closed and normally-closed R3–b are open. Thus, the drive clutch 46 is energized and the return clutch 50 is de-energized. Since the drive motor 45 is on and the drive clutch 46 energized, the lead screw 38 is rotated toward the right thus lowering the support shaft 33 and the elements attached to it. Initial downward movement of the trip bar 55 triggers the return limit switch 58 from position #1 to position #2.

Power is also supplied to the elongation measuring equipment 85 by way of the closed contacts ER–a and R7–b. The light source 68 is turned on and a counter mechanism 86 is energized which records a count each time a counter solenoid 87 is energized in a manner to be explained hereinbelow. An opaque portion of the apertured plate 74 lies interposed between the light source 68 and the photocell 69 when the support shaft is in the starting position so that no light from the source impinges on the photocell.

As the support shaft 33 is driven downward by the drive motor 45 and its associated mechanism, the second wire clamp is lowered thus elongating the wire 11 held between the two wire clamps 10 and 12 and placing it under tension. Since the first clamp is attached to the vertical support 13 which in turn is mounted on the supports 19 and 20 of the force responsive member of the weighing machine, the tensional stress is transmitted to the force responsive member as a downward acting force. Because the weighing machine becomes balanced by displacement of the force responsive member a distance which is a function of the magnitude of the applied force, the vertical support 13 and the first wire clamp 10 are moved downward, but to a lesser extent than the support shaft 33 and second wire clamp 12.

The first aperture 75 in the opaque plate 74 is located so as to permit a light beam from the light source 68 of the elongation measuring equipment 85 to impinge on the photocell 69 after a predetermined distance of relative movement has occurred between the support shaft 33 and the vertical support 13. When the wire under test has been elongated this distance, light passes through the aperture and strikes the photocell. Current generated by the photocell energizes the photoelectric relay PR causing its normally-open contacts PR–a to close. These contacts remain closed only while light is impinging on the photocell. Current flows through the closed contacts PR–a to the counter solenoid 87, relay R4, and delay relay DR6 energizing all three. Energizing of the counter solenoid 87 causes the counter 86 to record a count. The normally-open contacts R4–a and R4–b of the relay R4 close. Since the contacts R4–a close, the counter solenoid 87, relay R4, and delay relay DR6 remain energized regardless of the length of time that the beam of light from the light source impinges on the photocell and holds the contacts PR–a closed.

When relay contacts R4–b close, relay R5 becomes energized thereby closing its normally-open contacts R5–a. Relay R5 thus remains energized so long as power is supplied to line 81. A scale lamp 88 which is located so as to illuminate the scale 23 and pointer 22 of the weighing machine 21 is thereby turned on. A signal is thus provided indicating that the wire under test has been elongated an amount equal to the predetermined distance between the point the beam of light strikes the opaque plate 74 when the support shaft 33 is in the starting position and the first aperture 75. A scale reading taken at that instant denotes the magnitude of the force of the tensional stress applied to the wire sample which causes the predetermined amount of elongation.

The delay relay DR6 is also energized when light strikes the photocell, but its normally-closed contacts DR6–$a$ do not open immediately by virtue of the delay mechanism in the relay. Therefore, the counter solenoid 87, relay R4, and delay relay DR6 remain energized for the period of delay. The delay is set so as to be longer than the time during which the aperture 75 in the plate 74 is in line with the light source 68 and photocell 69. Thus, the beam of light is blocked from reaching the photocell and the photo-electric relay contacts PR–$a$ open before the delay relay contacts DR6–$a$ open. In this way it is assured that the counter 86 will not record more than one count during the period the aperture is in line with the light source and photocell. When the delay relay contacts DR6–$a$ open, the counter solenoid 87 is de-energized and the relay R4 is also de-energized opening its contacts R4–$a$ and R4–$b$. The delay relay is also de-energized and its contacts DR6–$a$ assume their normally-closed position. The elongation measuring equipment 85 is thus reset in condition to record another count. Since in the elongation measuring equipment as described the elements attached to the vertical support 13 and those attached to the movable support shaft 33 do not physically contact each other, there are no frictional effects which would reduce the accuracy of the tensional force measurements.

The apparatus continues to operate with the drive arrangement rotating the lead screw 38 to lower the support shaft 33 at a constant rate. Each time that one of the plurality of apertures 75 in the opaque plate 74 comes in line between the light source 68 and the photocell 69 the light beam strikes the photocell. The elements of the elongation measuring equipment 85 repeat the previously described sequence of operations and another count is recorded in the counter 86.

Each time the wire under test elongates a distance equal to the increment of distance between two apertures in the apertured plate, the support shaft 33 moves downward the same distance relative to the vertical support 13 and the light beam strikes the photocell to cause another count to be recorded. This action is repeated periodically until the wire 11 under test brakes. When the test wire breaks, the necessary ground connection for the internal circuitry of the electronic relay is disrupted and the relay is de-energized. The relay contacts assume their normally biased positions with contacts ER–$a$ and ER–$b$ open, and ER–$c$ closed. When contacts ER–$a$ are opened, electrical power is no longer supplied to the elongation measuring equipment. The light source 68 is turned off, the counter 86 is inactivated, and the counter solenoid 87, relay R4, and delay relay DR6 cannot be energized. Therefore, no additional counts can be recorded by the counter 86. The total number of counts recorded by the counter during a test procedure is equal to the number of apertures which have passed between the light source and photocell, thus providing an indication of the amount of elongation of the wire sample before breaking.

At the instant the wire under test breaks, the force of the tensional stress is removed from the vertical support 13, and the mechanism of the weighing machine returns to its state of balance with no load applied. The pointer 22 also returns to its no-load position. The maximum scale reading indicated by the pointer before it returns to the no-load position is a measure of the breaking stress of the test sample. The maximum reading may be noted by an operator observing the test procedure, or if desired a maximum recording type of indicator may be employed.

The de-energizing of the electronic relay 80 and consequent opening of relay contacts ER–$a$ also de-energizes relay R3 causing contacts R3–$a$ to assume their normally-open position and contacts R3–$b$ to assume their normally-closed position. Thus the drive motor clutch 46 is de-energized stopping rotation of the lead screw 38 and lowering of the support shaft 33, and the return motor clutch 50 is energized. Since contacts ER–$a$ and ER–$b$ are both open, the drive motor 45 is turned off; and since contacts ER–$c$ are closed and the return limit switch 58 is held in position #2 by the trip bar, the return motor 49 is turned on. The closing of relay contacts ER–$c$ also energizes relay R7, thereby closing its normally-open contacts R7–$a$ and opening its normally-closed contacts R7–$b$. Thus, power cannot be supplied to the drive motor, relay R3, or the elongation measuring equipment, and the return motor cannot be turned off if for some reason, as by the inadvertent grounding of the portion of the broken wire specimen connected to the electronic relay, the electronic relay should become re-energized.

With the return motor 49 turned on and the return motor clutch 50 energized, the lead screw 38 rotates to the left driving the lead screw nut 37 and the support shaft 33 upward. As the support shaft is moved upward it carries the various items mounted thereon with it. When the trip bar 55 has been raised clear of the return limit switch 58 the switch contacts return to their normally biased position #1. The return motor 49 is thereby turned off stopping upward movement of the support shaft. The shaft and its associated elements are thus returned to the raised position which they occupy at the start of each test procedure.

When the return limit switch is triggered to position #1, relay R2 is energized and its normally-closed contacts R2–$a$ are opened. Relay R1 is thus de-energized and relay contacts R1–$a$ return to their normally-open position. The circuit supplying power to the line 81 is thereby disrupted, and all of the electrical elements receiving power from that line are de-energized or turned off. The electronic relay was previously de-energized by virtue of the disruption of the ground connection through the wire under test. Thus, the test procedure is completed, and the apparatus is in readiness for conducting the next test.

The travel limit switch 59 is positioned along the path of travel of the trip bar 55 beyond the normally anticipated distance of travel of the bar. In the event that the wire does not break as expected or some malfunction occurs in the apparatus so that the downward movement of the support shaft is not stopped before the trip bar reaches the travel limit switch, the trip bar will trigger the switch and turn off the drive motor. Damage to the apparatus by excessive downward movement of the support shaft is thus prevented.

Certain elements of the apparatus disclosed herein may be designed specifically for the particular tests being conducted. As a typical example, in conducting tests on molybdenum wire of .003 inch diameter, the wire clamps were spaced apart about 10 inches. The distance between the apertures in the apertured plate was 0.1 inch so that the total elongation of the test sample was measured to within 1%. The wire generally elongated on the order of 15% to 25% before breaking. The apertured plate was arranged with respect to the light source and photocell so that the light beam impinged on the plate at a distance of 0.1 inch above the first aperture. Thus, the scale lamp turned on to signal that a reading of the stress in the sample be taken when the sample had elongated 1%. This data was used to determine the stress-strain relation of the wire when not stressed beyond its elastic limit. It was also used to calculate an empirical value for the yield point of the wire. The weighing machine employed was calibrated to provide readings in grams. The range of the mechanism was such that readings of the force of tensional stress at 1% elongation and at the breaking point could be made with satisfactory accuracy. The tensional stress in molybdenum wire of .003 inch diameter at 1% elongation was of the order of 300 grams and the breaking stress was of the order of 400 grams.

The apparatus employed a lead screw 38 and nut 37 having 20 threads per inch. The drive motor arrangement rotated the lead screw at approximately 30 revolutions per minute. Thus, the support shaft and its associated elements were driven downward at the rate of 1.5 inches per minute.

By employing apparatus according to the invention a single test procedure conducted on a single sample of wire provides data for determining various physical properties of the wire. The test specimen is merely placed between the two wire clamps then the start button is actuated. The scale readings of the weighing machine are taken at the instant the scale lamp goes on after the sample has been elongated a predetermined amount and again when the scale reading is at a maximum just prior to breaking of the wire. An indication of the total amount of elongation is automatically recorded by the counter. After the apparatus completes the test procedure by stretching the wire until it ruptures, the apparatus automatically returns to the starting position and is in readiness to receive another specimen of wire to be tested. The automatic return feature assures that the distance between the wire clamps for each specimen tested is always the same. Accurate, rapid measurement of the physical properties of wire can thus be made simply and efficiently with test apparatus according to the invention.

What is claimed is:

1. Apparatus for testing filamentary material comprising in combination a force measuring mechanism including a force responsive member moveable vertically downward in response to the application of a downward acting force on the member and means for indicating the magnitude of the force being applied to the member, a vertical support mounted on the force responsive member, a first gripping means fixed to said support for gripping one end of a piece of filamentary material, a moveable support, driving means for moving said moveable support vertically downward from a raised position, return means for moving said moveable support vertically upward to said raised position, a second gripping means fixed to said moveable support positioned directly below the first gripping means when the moveable support is in the raised positon for gripping the other end of a piece of filamentary material, a photo-sensitive element mounted on one of said supports, a light source mounted on the one of said supports and arranged to direct a beam of light onto said photosensitive element;

an opaque member mounted on the other of said supports and interposed between the photo-sensitive element and the light source, said opaque member having a plurality of light transmitting apertures arranged vertically therein whereby as said moveable support is moved vertically with respect to the vertical support the apertures are interposed sequentially between the light source and the photo-sensitive element permitting a beam of light from the light source periodically to impinge on the photo-sensitive element, counting means for recording an indication each time a beam of light from the light source impinges on the photo-sensitive element, means for activating the driving means to cause said moveable support to move vertically downward from the raised position, and means responsive to rupture of a piece of filamentary material held between the first and second gripping means for inactivating the driving means, activating the return means, and inactivating the counting means.

2. Apparatus for testing filamentary material comprising in combination a force measuring mechanism including a force responsive member moveable vertically downward in response to the application of a downward acting force on the member and indicating means for indicating the magnitude of the force being applied to the member, a vertical support mounted on the force responsive member, a first gripping means fixed to said support for gripping one end of a piece of filamentary material, a moveable support, driving means for moving said moveable support vertically downward from a raised position, return means for moving said moveable support vertically upward to said raised position, a second gripping means fixed to said moveable support positioned directly below the first gripping means when the moveable support is in the raised position for gripping the other end of a piece of filamentary material, a photo-sensitive element mounted on the moveable support, a light source mounted on the moveable support and arranged to direct a beam of light onto said photo-sensitive element, an opaque member having a plurality of light transmitting apertures therein arranged in spaced apart relationship along a straight line, said opaque member being mounted on the vertical support and interposed between the photo-sensitive element and the light source with said apertures lying along a vertical line intersected by a beam of light directed from the light source toward the photo-sensitive element, counting means for recording an indication each time a beam of light from the light source impinges on the photo-sensitive element, signal means positioned adjacent said indicating means of the force measuring mechanism for indicating when a beam of light first impinges on the photo-sensitive element, means for activating the driving means to cause said moveable support to move vertically downward from the raised position, means responsive to rupture of a piece of filamentary material held between the first and second gripping means for inactivating the driving means, activating the return means, and inactivating the counting means, and switch means responsive to return of the moveable support to the raised position for inactivating the return means.

3. Apparatus for testing wire comprising in combination a force measuring mechanism including a force responsive member adapted to be moved vertically downward a distance which is a function of the magnitude of a downward acting force applied to the member and indicating means responsive to the distance of movement of said member for indicating the magnitude of the force being applied to the member, a vertical support mounted on the force responsive member, a first clamp fixed to said vertical support for gripping one end of a piece of conductive wire, a moveable support, driving means for moving said moveable support vertically downward from a raised position, return means for moving said moveable support vertically upward to said raised position,
a second clamp fixed to said moveable support positioned directly below the first clamp when the moveable support is in the raised position for gripping the other end of a piece of conductive wire, a conductive path between the first and second clamps being provided by a piece of conductive wire gripped by the first and second clamps,
a bifurcated mounting member extending from the moveable support and having its arms lying in a horizontal plane,
a photo-sensitive element mounted on one of the arms of the bifurcated mounting member and adapted to produce a signal in response to light,
a light source mounted on the other arm of the bifurcated mounting member and arranged to direct a horizontal beam of light onto said photo-sensitive element,
an opaque member having a plurality of light transmitting apertures therein arranged in spaced apart relationship along a straight line,
said opaque member being mounted on the vertical support and interposed between the photo-sensitive element and the light source with said apertures lying along a vertical line intersected by a beam of light directed from the light source toward the photo-sensitive element,
counting means for recording an indication in response to a signal from the photo-sensitive element,
signal means positioned adjacent said indicating means of the force measuring mechanism,
control means adapted to activate the driving means to cause said moveable support to move vertically downward from the raised position, activate the counting means to cause an indication to be recorded in response to each signal from the photo-sensitive element, and activate the signal means in response to a signal from the photo-sensitive element,
said control means also being adapted in response to disruption of the conductive path between the first and second clamps provided by a piece of conductive wire to inactivate the counting means, inactivate the driving means, and activate the return means, and
switch means responsive to return of the moveable support to the raised position for inactivating the return means and the signal means.

4. Apparatus for testing filamentary material comprising in combination
a force measuring mechanism including a member moveable in response to the application of a force to the member and means for indicating the magnitude of the force being applied to the member,
a support mounted on the member,
a first gripping means fixed to said support for gripping one end of a piece of filamentary material,
a moveable support,
a second gripping means fixed to said moveable support for gripping the other end of a piece of filamentary material,
driving means for moving said moveable support from a starting position in a direction to move the second gripping means away from the first gripping means and cause the support mounted on the member to apply a force to the member as a piece of filamentary material held between the first and second gripping means is placed under tension,
return means for moving said moveable support in a direction to move the second gripping means toward the first gripping means to position the moveable support at said starting position,
a cooperative arrangement of radiation transmitting and sensing elements including physically separate means mounted on the support mounted on the member and on the moveable support for providing signals in response to incremental distances of relative movement of the moveable support with respect to the support mounted on the member,
recording means for recording an indication of said signals,
means for activating the driving means to cause said moveable support to move from the starting position in a direction to move the second gripping means away from the first gripping means, and
means responsive to rupture of a piece of filamentary material held between the first and second gripping means for inactivating the driving means, activating the return means, and inactivating the recording means.

References Cited by the Examiner

UNITED STATES PATENTS

| 3,138,952 | 6/1964 | Dobbins | 73—95 X |
| 3,140,601 | 7/1964 | Weyland et al. | 73—95 X |
| 3,220,250 | 11/1965 | Strandquist et al. | 73—95 |

FOREIGN PATENTS

| 560,832 | 4/1944 | Great Britain. |

RICHARD C. QUEISSER, *Primary Examiner.*

J. JOSEPH SMITH, *Assistant Examiner.*